United States Patent [19]

Kleefisch et al.

[11] Patent Number: 5,980,840
[45] Date of Patent: Nov. 9, 1999

[54] AUTOTHERMIC REACTOR AND PROCESS USING OXYGEN ION—CONDUCTING DENSE CERAMIC MEMBRANE

[75] Inventors: Mark S. Kleefisch, Plainfield; Carl A. Udovich, Joliet; Alakananda Bhattacharyya, Wheaton, all of Ill.; Thaddeus P. Kobylinski, Prospect, Pa.

[73] Assignee: BP Amoco Corporation, Chicago, Ill.

[21] Appl. No.: 08/845,310

[22] Filed: Apr. 25, 1997

[51] Int. Cl.[6] .................. B01J 8/02; F28D 21/00; C10J 1/28; B01D 53/22
[52] U.S. Cl. ............. 422/211; 422/204; 422/236; 422/239; 252/373; 48/197 R; 95/54
[58] Field of Search ............... 422/191, 211, 422/238, 239, 204; 204/410, 265, 421; 429/8, 30; 48/198.7, 127.7; 95/54

[56] References Cited

U.S. PATENT DOCUMENTS

| | | |
|---|---|---|
| 4,666,680 | 5/1987 | Lewis ........................... 422/148 |
| 5,126,499 | 6/1992 | Hayakawa .................... 585/500 |
| 5,306,411 | 4/1994 | Mazanec et al. ............. 204/265 |
| 5,356,728 | 10/1994 | Balachandran et al. ...... 429/8 |
| 5,364,506 | 11/1994 | Gur et al. ..................... 205/334 |
| 5,573,737 | 11/1996 | Balachandran et al. ...... 422/211 |
| 5,614,163 | 3/1997 | Bhattachrayya et al. ..... 423/18.2 |
| 5,741,474 | 4/1998 | Isomura et al. .............. 423/648.1 |
| 5,820,655 | 10/1998 | Gottzmann et al. .......... 95/54 |

FOREIGN PATENT DOCUMENTS

| | | |
|---|---|---|
| 311307A2 | 9/1988 | European Pat. Off. . |
| 399833A1 | 5/1990 | European Pat. Off. . |
| 438902A2 | 12/1990 | European Pat. Off. . |
| 705790A1 | 4/1996 | European Pat. Off. . |
| 73205A1 | 9/1996 | European Pat. Off. . |

OTHER PUBLICATIONS

"Oxygen Ion–Conducting Dense Ceramic" International Publication No. WO 94/24065, published Oct. 27, 1994, filed Apr. 5, 1994.

*Primary Examiner*—Robert J. Warden, Sr.
*Assistant Examiner*—James Kennedy
*Attorney, Agent, or Firm*—Thomas A. Yassen; Robert E. Sloat

[57] ABSTRACT

The present invention relates to devices for conducting, simultaneously, exothermic and endothermic chemical conversions with transfer of heat therebetween. More particularly, this invention relates to autothermic modules using oxygen ion-conducting dense ceramic membranes to separate, selectively, oxygen from an oxygen-containing gas and supply it directly to partial combustion of gaseous organic compounds. Processes using autothermic modules in accordance with this invention are, advantageously, used for production of synthesis gas comprising carbon monoxide and molecular hydrogen which synthesis gas is substantially free of deleterious and/or inert gaseous diluents such as nitrogen. In particular, for conversions, within the integral autothermic module, of natural gas or other forms of gaseous lower alkanes to synthesis gas by means of partial combustion followed by reforming.

20 Claims, 1 Drawing Sheet

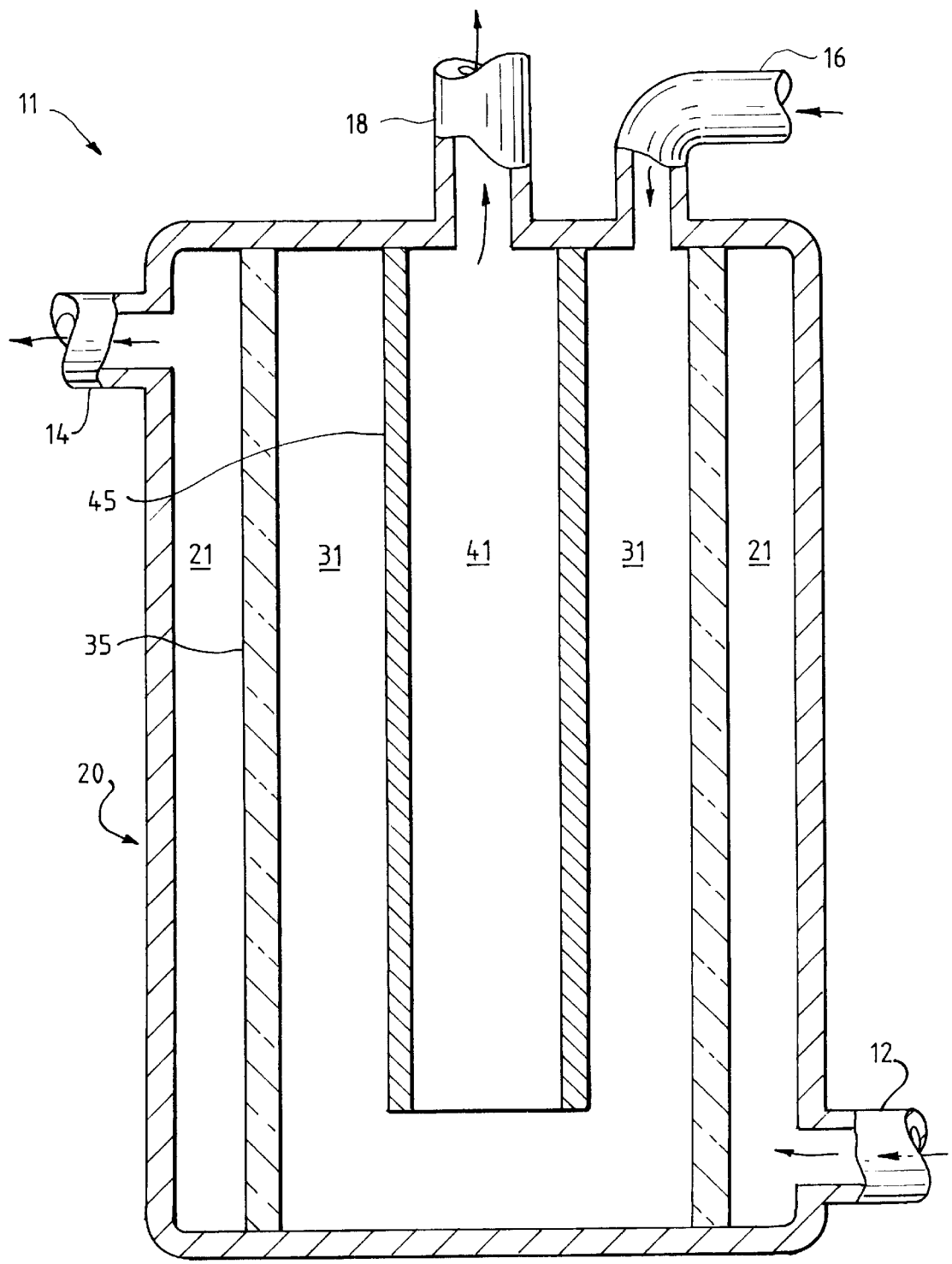

AUTOTHERMIC REACTOR AND PROCESS USING OXYGEN ION— CONDUCTING DENSE CERAMIC MEMBRANE

TECHNICAL FIELD

The present invention relates to devices for conducting, simultaneously, exothermic and endothermic chemical conversions with transfer of heat therebetween. More particularly, this invention relates to autothermic modules using oxygen ion-conducting dense ceramic membranes to separate, selectively, oxygen from an oxygen-containing gas and supply it directly to partial combustion of gaseous organic compounds, and endothermic chemical conversions of resulting gaseous mixtures to value added products within the autothermic modules.

Processes using autothermic modules in accordance with the invention are, for example, used for production of synthesis gas comprising carbon monoxide and molecular hydrogen which synthesis gas is, advantageously, free of deleterious and/or inert gaseous diluents such as nitrogen. The devices of the invention are particularly suitable for conversions of natural gas or other forms of gaseous lower alkanes to synthesis gas by means of combining partial combustion and steam and/or carbon dioxide reforming within the integral autothermic module.

BACKGROUND OF THE INVENTION

Conversion of low molecular weight alkanes, such as methane, to synthetic fuels or chemicals, has received increasing attention as low molecular weight alkanes are generally available from secure and reliable sources. For example, natural gas wells and oil wells currently produce vast quantities of methane. In addition, low molecular weight alkanes are generally present in coal deposits and may be formed during mining operations, in petroleum processes, and in the gasification or liquefaction of coal, tar sands, oil shale, and biomass.

Many of these alkane sources are located in relatively remote areas, far from potential users. Accessibility is a major obstacle to effective and extensive use of remotely situated methane, ethane and natural gas. Costs associated with liquefying natural gas by compression or, alternatively, constructing and maintaining pipelines to transport natural gas to users are often prohibitive. Consequently, methods for converting low molecular weight alkanes to more easily transportable liquid fuels and chemical feedstocks are desired and a number of such methods have been reported.

Reported methods can be conveniently categorized as direct oxidation routes and/or as indirect syngas routes. Direct oxidative routes convert lower alkanes to products such as methanol, gasoline, and relatively higher molecular weight alkanes. In contrast, indirect syngas routes involve, typically, production of synthesis gas as an intermediate As is well known in the art, synthesis gas ("syngas") is a mixture of carbon monoxide and molecular hydrogen, generally having a dihydrogen to carbon monoxide molar ratio in the range of 1:5 to 5:1, and which may contain other gases such as carbon dioxide. Synthesis gas has utility as a feedstock for conversion to alcohols, olefins, or saturated hydrocarbons (paraffins) according to the well known Fischer-Tropsch process, and by other means. Synthesis gas is not a commodity; rather, it is typically generated on-site for further processing. One potential use for synthesis gas is as a feedstock for conversion to high molecular weight (e.g. $C_{50+}$) paraffins which provide an ideal feedstock for hydrocracking for conversion to high quality jet fuel and superior high cetane value diesel fuel blending components. Another potential application of synthesis gas is for large scale conversion to methanol.

In order to produce high molecular weight paraffins in preference to lower molecular weight (e.g. $C_8$ to $C_{12}$) linear paraffins, or to synthesize methanol it is desirable to utilize a synthesis gas feedstock having an $H_2$:CO molar ratio of about 2:1 or less. As is well known in the art, Fischer-Tropsch syngas conversion reactions using syngas having relatively high $H_2$:CO ratios produce hydrocarbon products with relatively large amounts of methane and relatively low carbon numbers. For example, with an $H_2$:CO ratio of about 3, relatively large amounts of C1–C8 linear paraffins are typically produced. These materials are characterized by very low octane value and high Reid vapor pressure, and are highly undesirable for use as gasoline.

Lowering the $H_2$:CO molar ratio alters product selectivity by increasing the average number of carbon atoms per molecule of product, and decreases the amount of methane and light paraffins produced. Thus, it is desirable for a number of reasons to generate syngas feedstocks having molar ratios of hydrogen to carbon monoxide of about 2:1 or less.

Prior methods for producing synthesis gas from natural gas (typically referred to as "natural gas reforming") can be categorized as (a) those relying on steam reforming where natural gas is reacted at high temperature with steam, (b) those relying on partial oxidation in which methane is partially oxidized with pure oxygen by catalytic or non-catalytic means, and (c) combined cycle reforming consisting of both steam reforming and partial oxidation steps.

Steam reforming involves the high temperature reaction of methane and steam over a catalyst to produce carbon monoxide and hydrogen. This process, however, results in production of syngas having a high ratio of hydrogen to carbon monoxide, usually in excess of 3:1.

Partial oxidation of methane with pure oxygen provides a product which has an $H_2$:CO ratio close to 2:1, but large amounts of carbon dioxide and carbon are co-produced, and pure oxygen is an expensive oxidant.

An expensive air separation step is required in combined cycle reforming systems, although such processes do result in some capital savings since the size of the steam reforming reactor is reduced in comparison to a straightforward steam reforming process.

Thus, it is desirable to lower the cost of syngas production as by, for example, reducing the cost of the oxygen plant, including eliminating the cryogenic air separation plant, while improving the field as by minimizing the co-production of carbon, carbon dioxide and water, in order to best utilize the product for a variety of downstream applications.

In view of the great commercial interest in preparing synthesis gas by reforming readily available hydrocarbon feedstocks such as natural gas, and because of the benefits of conducting these reforming reactions in the presence of a catalyst that remains active for an extended period of use, there is a continuing need for new, less expensive, durable, coke resistant, more active and selective catalysts for the production of synthesis gas. The present invention provides such catalysts as well as a method for preparing synthesis gas using such catalysts.

European Patent Application 90305684.4, published on Nov. 28, 1990, under Publication No. EP 0 399 833 A1 in the name of Cable et al., describes an electrochemical reactor using solid membranes comprising; (1) a multi-phase mixture of an electronically-conductive material, (2) an oxygen ion-conductive material, and/or (3) a mixed metal oxide of a perovskite structure. Reactors are described in which oxygen from oxygen-containing gas is transported through a membrane disk to any gas that consumes oxygen. Flow of gases on each side of the membrane disk in the reactor shell shown are symmetrical flows across the disk, substantially radial outward from the center of the disk toward the wall of a cylindrical reactor shell. The gases on each side of the disk flow parallel to, and co-current with, each other.

Materials known as "perovskites" are a class of materials which have an X-ray identifiable crystalline structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of each cube edge. This cubic lattice is identified as an $ABO_3$-type structure, where A and B represent metal ions. In the idealized form of perovskite structures, generally, it is required that the sum of the valences of A ions and B ions equal 6, as in the model perovskite mineral, $CaTiO_3$.

Many materials having the perovskite-type structure ($ABO_3$-type) have been described in recent publications including a wide variety of multiple cation substitutions on both the A and B sites said to be stable in the perovskite structure. Likewise, a variety of more complex perovskite compounds containing a mixture of A metal ions and B metal ions (in addition to oxygen) are reported. Publications relating to perovskites include: P. D. Battle et al., J. Solid State Chem., 76,334 (1988); Y. Takeda et al., Z Anorg. Allg. Chem., 550/541,259 (1986); Y. Teraoka et al., Chem. Lett., 19, 1743 (1985); M. Harder and H. H. Muller-Buschbaum, Z. Anorg. Alig. Chem., 464, 169 (1980); C. Greaves et al., Acta Cryst., B31,641 (1975).

U.S. Pat. No. 5,126,499 in the names of Takashi Hayakawa, Katsuomi Takehira, Hideo Orita, Masao Shimizu and Yoshihito Watanabe (Hayakawa et al.) and assigned to Director-General of Agency of Industrial Science and Technology, Japan, describes a process for the production of hydrocarbons by oxidative coupling of methane with an oxide of metals having the following composition:

$$M_1(Co_{1-x}Fe_x)_1O_y$$

i.e. a perovskite-type, because the ratio of B positioned metal ions and A positioned metal ions equal 1, and is described as such (Hayakawa et al., column 2, lines 25 to 39).

United Kingdom Patent Application GB 2213496 A listing Lywood as inventor describes the production of hydrogen-containing gas streams by an endothermic catalyzed reforming between methane and steam. The '496 Application proposes the following equations for the steam reforming of methane:

$$CH_4+H_2O \rightarrow CO+3H_2 \qquad 1.$$

$$CH_4+2H_2O \rightarrow CO_2+4H_2 \qquad 2.$$

$$CH_4+CO_2 \rightarrow 2CO+2H_2 \qquad 3.$$

U.S. Pat. No. 4,592,903 issued to Osman et al., states that carbon monoxide can be exothermically converted to carbon dioxide and hydrogen through a reaction termed a water-gas shift, represented by the equation:

$$CO+H_2 \rightarrow CO_2+H_2 \qquad 4.$$

Reportedly, the "shift" reaction, can be accomplished in two shift conversion vessels operating at different temperatures to maximize yield. The '903 patent states that a temperature of from about 600° to 900° F. and a pressure of about 300 psig to 1,000 psig is effective in a high-temperature shift converter containing a supported, chromium-promoted iron catalyst. The '903 Patent further states that a low-temperature shift conversion takes place over a catalyst comprising a mixture of zinc and copper oxides at a temperature of from about 400° to 500° F. and a pressure of from about 300 psig to about 1,000 psig.

It is important to distinguish between the steam reforming of hydrocarbons, as described above, and the partial oxidation of hydrocarbons. Partial oxidation of methane produces two moles of dihydrogen (diatomic hydrogen) for each mole of methane reacted. In contrast, steam reforming of methane produces three moles of dihydrogen per mole of reacted methane.

Partial oxidation of methane is described, for example, in U.S. Pat. No. 4,618,451 issued to Gent. The '451 Patent states that methane is reacted with oxygen from an air separation plant, the proportion of oxygen being less than sufficient for complete combustion. A hot gas containing hydrogen and carbon monoxide is said to be produced. The '451 patent also states that steam or nitrogen can be present during the combustion to act as a temperature modifier and to avoid soot formation. Additional hydrocarbon is, reportedly, injected into the hot gas, and the resulting gas mixture is reacted over a steam reforming catalyst.

A particular class of partial oxidation processes for converting methane or natural gas to synthesis gas are known as autothermic processes. By convention, the autothermic process includes an exothermic oxidation step and an endothermic steam reforming step which are in approximate heat balance. For example, U.S. Pat. No. 5,112,257 issued to Kobylinski and assigned to the assignee of the present invention, describes an autothermal process for converting natural gas to synthesis gas which includes the steps of mixing natural gas with air, subjecting a resulting mixture to simultaneous partial oxidation and steam reforming reactions, and subsequently reacting unconverted alkanes with water in the presence of a catalyst having steam reforming activity.

Processes which produce hydrogen or hydrogen-containing mixtures by reacting a single-carbon saturated alcohol, methanol, with steam are collectively termed methanol steam reforming processes. U.S. Pat. No. 4,091,086, issued to Hindin et al., describes a process for producing hydrogen by reacting steam with methanol in the presence of a catalytic composition at elevated temperatures. The '086 Patent states that methanol can be converted to hydrogen in a single-stage reaction over a catalytic composition comprising zinc oxide, copper oxide, thorium oxide, and aluminum oxide. Moreover, the '086 Patent states, without citing authority or presenting evidence in support, that the composition catalyzes a purported methanol decomposition. The purported decomposition is described as producing significant amounts of carbon monoxide which are immediately consumed in a water gas shift reaction.

U.S. Pat. 3,791,933, issued to Rostrup-Nielsen, discloses the preparation of catalysts for reforming gaseous or vaporizable liquid hydrocarbons using steam, carbon oxide, oxygen and/or air. Examples in U.S. Pat. No. 3,791,993 show that compositions having nickel, magnesium and aluminum are suitable for converting naphtha to hydrogen-rich gaseous products using steam reforming.

U.S. Pat. No. 4,743,576, issued to Broecker et al., describes a catalyst for the production of synthesis gas or hydrogen from aqueous methanol by dissociation or steam reforming. The catalyst reportedly contains a noble metal component on an oxide carrier which comprises an oxide of cerium or titanium and, also, an oxide of zirconium or lanthanum.

Hydrotalcite-like compounds have been used as catalysts in a variety of applications, such as catalysts for aldol condensation, polymerization of alkene oxides, hydrogenation catalysts, dehydrogenation catalysts, etc., as described in F. Cavani et al., Catalysis Today, Volume 11, pages 173–301, 1991. Cavani et al. discloses that coprecipitated Ni, Al-based catalysts have been recognized as satisfying all the requirements for operation in steam reforming for methane production, and that coprecipitated catalysts calcined at 723° K. (450° C.) and reduced at 723° K. were active in the 673° K. to 923° K. (450° C. to 650° C.) range for steam cracking of naphtha to produce methane. U.S. Pat. No. 3,865,753 to Broecker et al. discloses the use of a catalyst prepared by calcining $[Ni_5MgAl_2(OH)_{16}]CO_3 \cdot 4H_2O$ at a temperature in the range of 350° C. to 550° C., and which is subsequently reduced with hydrogen. Such a catalyst was used for the steam cracking of hydrocarbons having 2 to 30 carbon atoms at a temperature in the range of 300° C. to 450° C. to form methane.

Ross et al., J. of Catalysis, Volume 52, pages 280–290, 1978, have examined the reaction of methane with water over a catalyst derived from $Ni_6Al_2(OH)_{16}CO_3 \cdot 4H_2O$ at temperatures of 873° K. to 973° K. (600° C. to 700° C.). Kruissink et al., J. Chemical Society, Faraday Trans. I, Volume 77, 649–663, 1981, discusses the thermal treatment of nickel-containing compositions having x-ray patterns characteristic of the hydrotalcite-like minerals; and Hernandez et al., Thermochemica Acta, Volume 81, 311–318, 1984, investigated the thermal decomposition of hydrotalcite-like compounds of formula $[Ni_{(1-s)}Al_x (OH)_2]^{x+An}{}_{x/n} \cdot mH_2O$ where A is carbonate and sulfate. Using x-ray diffraction studies, these researchers identified nickel oxide as the decomposition product at temperatures above 600° C., whereas the corresponding spinel, $NiAl_2O_4$, was formed at temperatures higher than 1000° C.

British Patent 1,342,020, discloses catalysts having chemical composition $Ni_6Al_2CO_3(OH)_{16} \cdot 4H_2O$ and $Ni_3Mg_3Al_2CO_3(OH)_{16} \cdot 4H_2O$ and discloses that they have an application as hydrogenation, dealkylation and cracking catalysts. Clause et al, J. of Catalysis, Volume 133, 231–246 (1992) discloses the preparation and analysis of nickel-aluminum mixed oxides obtained by thermal decomposition of hydrotalcite-type precipitates. This paper also discloses that nickel-aluminum mixed oxides resulting from the thermal decomposition of hydrotalcite-like coprecipitates have been studied for steam reforming and methanation reactions.

Commonly assigned U.S. Pat. No. 5,399,537, issued to Bhattacharyya, Chang, Kleefisch and Udovich, discloses a nickel-containing catalyst precursor composition comprising at least one hydrotalcite-like compound having a preselected formula. Catalyst compositions formed therefrom by heat treatment to elevated temperatures under reforming conditions are, particularly, useful for the production of synthesis gas and which catalysts are resistant to coke formation when used to catalyze the reaction of a hydrocarbyl compound with an oxygen-containing gas at elevated temperatures to form synthesis gas. Also see, for example, commonly assigned U.S. Pat. No. 5,921,238. Patents '537 and '238 are specifically incorporated herein in their entirety by reference.

It is an object of the invention to overcome one or more of the problems described above.

Other objects and advantages of the invention will be apparent to those skilled in the art from a review of the following detailed description, taken in conjunction with the drawing and the appended claims.

SUMMARY OF THE INVENTION

In broad aspect, the present invention is directed to devices for conducting, simultaneously, exothermic and endothermic chemical conversions with transfer of heat therebetween. More particularly, this invention relates to devices using oxygen ion-conducting dense ceramic membranes to separate, selectively, oxygen from an oxygen-containing gas and supply it directly to partial combustion and/or partial oxidation of gaseous organic compounds, endothermic chemical reactions, and further conversions of the resulting gaseous mixture to value added products. Such chemical reactors are, advantageously, useful for conversion of natural gas to synthesis gas by controlled partial oxidation and reforming reactions, and when desired, subsequent conversion of the synthesis gas to added-value products, for example, by a water-gas shift process.

In one aspect, this invention is a device comprising a shell having an entrance port, an exit port and a passageway therebetween for flow of gases, and within the shell, at least one autothermic module for chemical conversions. Each module comprises a partial combustion compartment having a feed port and a catalytic compartment having a product port. The catalytic compartment is in flow communication with the combustion compartment through an opening therebetween. Each oxidation compartment is separated from the passageway by a partition containing a dense ceramic membrane comprising a crystalline mixed metal oxide which exhibits, at operating temperatures, electron conductivity, oxygen ion conductivity and ability to separate oxygen from a gaseous mixture containing oxygen and one or more other volatile components by means of the conductivities. Each catalytic compartment has, within the combustion compartment, a wall disposed to receive radiant heat from the partition without allowing catalyst, which is, typically, contained within the catalytic compartment, to have deleterious contact with the partition and, in particular, the dense ceramic membrane.

In one aspect, this invention is a method for preparing synthesis gas comprising feeding a gaseous or vaporizable hydrocarbyl compound and an oxygen-containing gas comprising molecular oxygen or carbon dioxide to a suitable reaction zone containing a catalyst formed by heat treating an active metal-containing hydrotalcite-like compound, and reacting the hydrocarbyl compound and the oxygen-containing gas in the presence of the catalyst at a temperature and at a pressure sufficient to form synthesis gas.

In another aspect, the invention provides a process for converting gaseous lower alkanes (e.g. natural gas) to synthesis gas having a desirably low $H_2$:CO molar ratio (e.g. about 2:1 or less) wherein a homogeneous mixture of lower alkanes is subjected to partial oxidation using a predetermined amount of oxygen whereby complete oxidation of a substantial portion of the alkanes is avoided, and thereafter the resulting mixture of gases comprising water, hydrogen, carbon monoxide and unconverted alkanes is reacted over a highly active steam reforming catalyst at a reaction temperature below the decomposition temperature of the alkanes to convert the alkanes to hydrogen and carbon monoxide.

In another aspect, this invention is a process for preparation of synthesis gas which comprises:

(A) Providing a device comprising a shell having an entrance port, an exit port and a passageway therebetween for flow of gases comprising a source of oxygen, and within the shell, at least one autothermic module for chemical conversions, each module comprising a combustion compartment having a feed port and a catalytic compartment containing chemical conversion catalyst and having a product port, the catalytic compartment in flow communication with the combustion compartment, through an opening therebetween, each combustion compartment separated from the passageway by a partition containing a dense ceramic membrane comprising a crystalline mixed metal oxide which exhibits, at operating temperatures, electron conductivity, oxygen ion conductivity and ability to separate oxygen from a gaseous mixture containing oxygen and one or more other volatile components by means of the conductivities, and each catalytic compartment having, within the combustion compartment, a wall disposed to receive radiant heat from the partition containing the dense ceramic membrane;

(B) Maintaining a relatively high oxygen partial pressure in the passageway by supplying a gaseous mixture comprising a source of oxygen thereto through the entrance port and expelling a depleted gaseous mixture from the passageway through the exit port;

(C) Maintaining a relatively low oxygen partial pressure in the oxidation compartment by supplying a dioxygen-free gaseous feed comprising one or more hydrocarbyl compound to the autothermic module through the feed port of the partial oxidation compartment;

(D) Permitting oxygen to be transported through the membrane from the oxygen-containing gaseous mixture having a relatively high oxygen partial pressure into the gaseous composition having a relatively low oxygen partial pressure, and oxidizing from about 20 to about 40 percent of the hydrocarbyl compounds in the feed to obtain heat and form a resulting mixture comprising combustion products and unconverted hydrocarbyl compounds; and (E) Contacting the resulting mixture with the chemical conversion catalyst in the catalytic compartment at temperatures in a range from about 500° C. to about 1150° C. to form synthesis gas comprising hydrogen and carbon monoxide; and (F) Permitting heat to be transferred from the combustion compartment into the catalytic compartment through the wall therebetween, and expelling the synthesis gas from the catalytic compartment through the product port.

The present invention relates, also, to preparation, structure, and properties of dense ceramic membranes comprising mixed metal oxide compositions which exhibit electron conductivity and oxygen ion conductivity, and ability to separate oxygen selectively from a gaseous mixture containing oxygen and one or more other volatile components by means of the conductivities. An essential feature of such selectively permeable material is that it retain its ability to separate and transport oxygen for an adequate period of time.

Autothermic reactors using oxygen ion-conducting dense ceramic membranes to separate, selectively, oxygen from an oxygen-containing gas according to the invention, are used, for example, to convert gaseous lower alkanes (e.g. C1 to C4 alkanes) to synthesis gas ("syngas") which comprises a gaseous mixture of molecular hydrogen ($H_2$) and carbon monoxide (CO) by means of partial oxidation of the alkanes with separated oxygen supplied directly to the partial oxidation, and subsequent catalytic and/or steam reforming of unconverted alkanes. While synthesis gas formed according to the invention may contain small amounts (e.g. up to 5 vol. %) of carbon dioxide, the synthesis gas, advantageously, does not containing substantial amounts of molecular nitrogen ($N_2$).

In one aspect, this invention is a process for preparing synthesis gas according to the invention wherein the catalyst comprises a composition formed by heat treating under reforming conditions to temperatures in a range upward from at least about 400° C., a catalyst precursor composition comprising at least one hydrotalcite-like compound having formula:

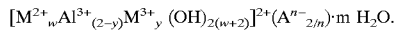

where w is a number in a range from about 2 to about 20; y is a number in a range from about 0 to about 2; $A^{n-}$ is an anion having a negative charge of n; and m is 0 or a positive number. $M^{2+}$ is at least one metal ion having a valence of 2+ selected from the group consisting of magnesium, chromium, manganese, iron, cobalt, nickel, copper and zinc ions. Preferably $M^{2+}$ is magnesium ions. $M^{3+}$ is at least one metal ion selected from the group consisting of rhodium and iron ions. $M^{3+}$ is at least one metal ion having a valence of 3+ selected from the group consisting of titanium, vanadium chromium, manganese, iron, cobalt, nickel, gallium, ruthenium, rhodium, lanthanum, cerium, praseodymium, neodymium, samarium, europium, gadolinium, terbium, dysprosium, holmium, erbium, thulium, ytterbium, lutetium and iridium ions. Preferably $M^{3+}$ is rhodium ions, w is about 4, and y is a number in a range from about 0.00001 to about 1.5; or $M^{3+}$ is iron ions, w is about 4, and y is 2. Preferably $A^{n-}$ is carbonate.

The process for production of synthesis gas according to the invention is, especially, suitable for conversion of natural gas (typically 85–95 vol. % methane. 2–10 vol. % ethane. and smaller amounts of propane and butane and traces of higher paraffinic hydrocarbons) into synthesis gas having a desirably low molar ratio of hydrogen to carbon monoxide, e.g. less than 3:1 and preferably about 2:1, i.e. in the range of about 1.8:1 to about 2.2:1.

BRIEF DESCRIPTION OF THE DRAWINGS

The appended claims set forth those novel features which characterize the present invention.

The present invention itself, as well as advantages thereof, may best be understood, however, by reference to the following brief description of preferred embodiments taken in conjunction with the annexed drawing, in which:

FIG. 1 is a sectional view depicting a preferred aspect of the present invention using oxygen ion-conducting dense ceramic membranes to separate, selectively, oxygen from an oxygen-containing gas and supply it directly to partial oxidation of gaseous organic compounds, and conversions, simultaneously, of the resulting gaseous mixture to value added products by endothermic chemical reactions.

For a more complete understanding of the present invention, reference should now be made to the embodiments illustrated in greater detail in the accompanying drawing and described below by way of examples of the invention.

BRIEF DESCRIPTION OF THE INVENTION

As stated previously, dense ceramic membranes useful in accordance with this invention comprises a crystalline mixed metal oxide which exhibits, at operating temperatures, electron conductivity, oxygen ion conductivity and ability to separate oxygen from a gaseous mixture containing oxygen and one or more other volatile components by means of the conductivities.

Suitable crystalline mixed metal oxide compositions may be, generally, selected from a class of materials which have an X-ray identifiable crystalline structure based upon the structure of the mineral perovskite, $CaTiO_3$. Dense ceramic membranes used in accordance with this invention comprise, preferably, a crystalline mixed metal oxide composition having an integral crystalline structure identifiable by means of powder X-ray diffraction pattern analysis wherein the integral crystalline structure comprises layers having a perovskite structure held apart by bridging layers having a different structure.

A preferred class of oxygen ion-conducting dense ceramic materials is disclosed in commonly assigned U.S. Pat. No. 5,580,497 to Balachandran, Kleefisch, Kobylinski, Morissette and Pei, which patent is specifically incorporated herein in its entirety by reference.

Particularly useful crystalline mixed metal oxide compositions are selected from a class of materials represented by $$D_\alpha E_{\alpha+\beta} O_\delta$$

where D comprises at least one metal selected from the group consisting of magnesium, calcium, strontium, and barium, E comprises at least one element selected from the group consisting of vanadium, chromium, manganese, iron, cobalt, and nickel, $\alpha$ is a number in a range from about 1 to about 4, $\beta$ is a number in a range upward from 0.1 to about 20, such that $$1.1 < (\alpha+\beta)/\alpha \leq 6,$$

and $\delta$ is a number which renders the compound charge neutral, wherein the crystalline mixed metal oxide composition has an integral crystalline structure identifiable by means of powder X-ray diffraction pattern analysis.

Preferred membranes include an inorganic crystalline material comprising strontium, iron, cobalt and oxygen, preferably having a powder X-ray diffraction pattern comprising significant lines substantially as described in Table I. Advantageously the crystalline mixed metal oxide demonstrates oxygen ionic conductivity and electronic conductivity. The invention includes method of preparation for the crystalline mixed metal oxide compositions containing at least strontium, cobalt, iron and oxygen. The invention also includes use of the crystalline mixed metal oxides in dense ceramic membranes having electron conductivity and oxygen ion conductivity, as well as their use in separation of oxygen from an oxygen-containing gaseous mixture. Typically in such processes the aforesaid membranes are used in separation apparatus for transfer of oxygen from an oxygen-containing first gaseous mixture having a relatively higher oxygen partial pressure to a second gaseous mixture having a relatively lower oxygen partial pressure and preferably containing one or more components, more preferably including organic compounds which react with oxygen. An essential feature of such selectively permeable dense ceramic membrane is that it retain its ability to separate oxygen for an adequate period of time at the conditions of operation.

Useful dense ceramic membranes comprise, advantageously, crystalline mixed metal oxide composition represented by $$D_\alpha E_{60\ +\beta} O_\delta$$

where D and E are chemically reactive elements independently selected from specified groups, $\alpha$ and $\beta$ are numbers such that $$1.1 < (\alpha+\beta)/\alpha \leq 6,$$

and $\delta$ is a number which renders the compound charge neutral. Crystalline mixed metal oxide compositions of the present invention have stratified crystalline structure identifiable by means of powder X-ray diffraction patterns. Dense ceramic membranes of the present invention which are made of the mixed metal oxide, exhibit electron conductivity and oxygen ion conductivity.

In another aspect of the invention the dense ceramic membranes comprise, advantageously, a crystalline mixed metal oxide composition represented by $$Sr_{60}(Fe_{1-x}Co_x)_{\alpha+\beta}O_\delta \quad (I)$$

where x is a number in a range from 0 to about 1, preferably in a range from about 0.1 to about 0.8, more preferably in a range from about 0.3 to about 0.7; $\alpha$ is a number in a range from about 1 to about 4, typically, about 1 or about 4; $\beta$ is a number in a range upward from 0 to about 20, preferably in a range from about 0.1 to about 6; more preferably such that $$1 < (\alpha+\beta)/\alpha \leq 6,$$

and $\delta$ is a number which renders the compound charge neutral. Advantageously, the crystalline mixed metal oxide composition represented by formula I has a powder X-ray diffraction pattern comprising significant lines substantially as described in Table I.

In another aspect of the invention the dense ceramic membranes comprise, advantageously, a crystalline mixed metal oxide composition represented by $$(Sr_{1-y}M_y)_\alpha(Fe_{1-x}Co_x)_{\alpha+\beta}O_\delta \quad (II)$$

where M is a metal selected from the group consisting of elements having atomic number in a range from 56 to 71, calcium (atomic number 20), and yttrium (atomic number 39); y is a number in a range from about 0.01 to about 0.95, preferably in a range from about 0.1 to about 0.5; x, $\alpha$, $\beta$, and $\delta$ are independently determined numbers as previously defined. Advantageously, the crystalline mixed metal oxide composition represented by formula II has a powder X-ray diffraction pattern comprising significant lines substantially as described in Table I.

In one aspect of the invention the dense ceramic membranes comprise, preferably, a crystalline mixed metal oxide composition represented by $$Sr_4(Fe_{1-x}Co_x)_6O_\delta \quad (III)$$

where x and $\delta$ are numbers as previously defined and the crystalline mixed metal oxide composition represented by formula III has a powder X-ray diffraction pattern comprising significant lines substantially as described in Table I.

In operation the face surface of a membrane is maintained in contact with an oxygen-containing gaseous mixture having a relatively high oxygen partial pressure; the obverse surface of the membrane is maintained in contact with a gaseous composition having a relatively low oxygen partial pressure or optionally containing no unreacted oxygen; and oxygen is transported through the membrane from the oxygen-containing gaseous mixture having a relatively high oxygen partial pressure into the gaseous composition having a relatively low oxygen partial pressure or containing no oxygen.

In Applicants' processes, separation of oxygen from an oxygen-containing gaseous mixture is, preferably, carried out with an oxygen ion-conducting dense ceramic membrane comprising a crystalline mixed metal oxide composition represented by a formula selected from the group I, II, and III. The oxygen ion-conducting dense ceramic membranes of this invention exhibit high oxygen fluxes at relatively low temperature, preferably oxygen permeation in a range upward from about 0.01 $cm^3$/min to about 100 $cm^3$/min at standard conditions per $cm^2$ of membrane wall area per $cm^2$ of membrane wall area. These membranes may be prepared by conventional techniques, and exhibit other desirable properties under process condition, including good chemical and thermal stability.

As is generally known, the assigned strengths in X-ray diffraction patterns may vary depending upon the characteristics of the sample. The observed line strength in any particular sample may vary from another sample, for example, depending upon the amounts of each crystalline phase, oxygen content, and/or amorphous material in a sample. Also, X-ray diffraction lines of a particular crystalline material may be obscured by lines from other materials present in a measured sample.

TABLE I

Principal XRD Lines

| Interplanar Spacing d, Å[1] | Assigned Strength |
|---|---|
| 9.52 ± .05 | Weak |
| 3.17 ± .05 | Weak |
| 2.77 ± .05 | Medium-Strong |
| 2.76 ± .05 | Medium-Strong |
| 2.73 ± .03 | Very Strong |
| 2.08 ± .03 | Weak-Medium |
| 1.96 ± .02 | Medium |
| 1.90 ± .02 | Weak-Medium |
| 1.592 ± .01 | Weak-Medium |
| 1.587 ± .01 | Medium |
| 1.566 ± .01 | Weak |

[1] Angstroms

Useful crystalline mixed metal oxide compositions can, also, be selected from a class of materials known, generally, as. perovskites which have an X-ray identifiable crystalline structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of each cube edge. This cubic lattice is identified as an $ABO_3$-type structure where A and B represent metal ions. In the idealized form of perovskite structures it is required that the sum of the valences of A ions and B ions equal 6, as in the model perovskite mineral, $CaTiO_3$.

The oxygen ion-conducting ceramic membrane provides a gas-tight partition between the passageway (first zone) and the oxidation compartment (second zones) wherein the ceramic is impervious to the components of the oxygen-containing gaseous mixture at ambient temperature. When an oxygen-containing gaseous mixture having a suitably high partial pressure of oxygen, i.e., in a range upward from about 0.2 atm., is applied to one side of a dense ceramic membrane of this type (the first surface), oxygen will adsorb and dissociate on the surface, become ionized and diffuse through the ceramic to the other side (the second surface) and deionize, associate and desorb as separated oxygen into another gaseous mixture having a partial pressure of oxygen lower than that applied to the first surface. The necessary circuit of electrons to supply this ionization/ deionization process is, advantageously, maintained internally in the oxide via its electronic conductivity.

Oxygen-containing gaseous mixtures suitable as feed streams to the present process typically contain between about 10 mole percent to 50 mole percent oxygen. Water, carbon dioxide, nitrogen and/or other gaseous components are typically present in feed mixtures. A preferred oxygen-containing gaseous mixture is atmospheric air. Volatile hydrocarbons which are converted to carbon dioxide and water under operating conditions of the process may be included in small amounts without causing adverse effect on the separation process. Representative of such hydrocarbons are linear and branched alkanes, alkenes and alkynes having from I to about 8 carbon atoms.

A difference in partial pressure of oxygen between the first and second zones, i.e., across the membrane, provides the driving force for separation of oxygen from an oxygen-containing gaseous mixture at process temperatures sufficient to cause oxygen in the first zone to adsorb, become ionized on the first surface and be transported through the ceramic membrane in ionic form toward the second surface of the ceramic membrane and the second zone where partial pressure of oxygen is lower than the first zone. Transported oxygen is collected and/or reacted in the second zone wherein ionic oxygen is converted into neutral form by release of electrons at the second surface.

An excess partial pressure of oxygen in the first zone over that in the second zone (positive oxygen partial pressure difference) can be created by compressing the gaseous mixture in the first zone to a pressure sufficient to recover transported oxygen, i.e., an oxygen permeate stream, at a pressure of greater than or equal to about one atmosphere. Typical feed pressures are in a range of from about 15 psia to abut 250 psia, depending largely upon the amount of oxygen in the feed mixture. Conventional compressors can be utilized to achieve the compression required to practice the present process.

Alternatively, a positive oxygen partial pressure difference between the first and second zones can be achieved by reaction of transported oxygen with an oxygen-consuming substance, such as a volatile organic compound, to form value added oxygen-containing products and/or by mechanically evacuation of the second zone to a pressure sufficient to recover transported oxygen. Advantageously, a gaseous mixture containing organic compounds such as methane, ethane, and other light hydrocarbon gases, is fed into the second zone wherein at least one of the compounds reacts with the oxygen transferred into the zone to form value added oxidation products.

In particular, it has been found that mixed metal oxides according to this invention (at operating temperatures) can have useful levels of oxygen ion conductivity.

Materials and methods useful in dense ceramic membrane preparation are described in U. Balachandran et al., "Fabrication of Ceramic-Membrane Tubes for Direct Conversion of Natural Gas", submitted for publication in the Proceedings of the 1992 International Gas Research Conference (IGRC92), Orlando, Fla., (Nov. 16–19, 1992); P. D. Battle et al., J. Solid State Chem., 76,334 (1988); Y .Takeda et al., Z. Anorg. Allg. Chem., 550/541, 259 (1986); Y. Teraoka et al., Chem. Lett., 19, 1743 (1985); M. Harder and H. H. Muller-Buschbaum, Z. Anorg. Allg. Chem., 464, 169 (1980); C. Greaves et al., Acta Cryst., B31, 641 (1975). Each of these publications is hereby incorporated herein by reference for its disclosure relating to preparation of dense ceramic membranes.

As mentioned above, the mixed metal oxide materials useful in dense ceramic membranes of this invention include any single phase and/or multi-phase, dense phase, intimate mixture of materials which has electron conductivity and oxygen ion conductivity. In relation to the solid metal oxide materials, the terms "mixture" and "mixtures" include materials comprised of two or more solid phases, and single-phase materials in which atoms of the included elements are intermingled in the same solid phase, such as in the yttria-stabilized zirconia. The term "multi-phase" refers to a material which contains two or more solid phases interspersed without forming a single phase solution. Useful core material, therefore, includes the multi-phase mixture which is "multi-phase" because the electronically-conductive material and the oxygen ion-conductive material are present as at least two solid phases, such that atoms of the various components of the multi-component solid are, primarily, not intermingled in the same solid phase.

Useful multi-phase solid core materials are described in European Patent Application number; 90305684.4, published on Nov. 28, 1990, under Publication No. EP 0 399 833 Al the disclosure of which is hereby incorporated herein by reference.

In the indirect method for making a dense ceramic membrane containing a mixed metal oxide material having crystalline structure according to the invention, a solid oxide is made and commuted to a powder, the powder is blended into a plastic mass with solvent liquid and optional additives, a desired shape formed from the plastic mass, and the shape heated to temperatures sufficient to form a dense and solid ceramic having electron conductivity and oxygen ion conductivity. Typically, such ceramics are obtained at temperatures in a range upward from about 500° C., and generally at temperatures in a range upward from about 800° C.

Membranes in ceramic cores and/or reactor cells according to this invention may, advantageously, comprise an inert support. An inert support may be any material which achieves the desired objective as long as it does not interfere with reaction processes under reaction conditions. For example, a wall of gas-impervious mixed metal oxide material of a perovskite structure may be supported on a porous or gas-impervious solid having a comb-like cross section. In another example, gas-impervious mixed metal oxide material of a perovskite structure may be deposited on a solid material which is porous to reactant and/or product gases and which functions as a support for the perovskite containing material. Any of a large number of oxides , including yttria-stabilized zirconia, doped ceria, thoria-based materials, or doped bismuth oxides, also useful as oxygen-conducting materials, and various other metal oxides may be used. Examples include CaO-stabilized $ZrO_2$; $Y_2O_3$-stabilized $ZrO_2$; $Sc_2O_3$-stabilized $Z_2$; $Y_2O_3$-stabilized $Bi_2O_3$; $Y_2O_3$-stabilized $CeO_2$; CaO-stabilized $CeO_2$; $ThO_2$; $Y_2O_3$-stabilized $ThO_2$; $ThO_2$, $ZrO_2$, $Bi_2O_3$, $CeO_2$ or $HfO_2$ stabilized by the addition of any one of the lanthanide oxides or CaO; $Al_2O_3$; etc.

Oxygen-containing gas streams which flow across the first surface of dense ceramic membranes in gas separation apparatus of this invention can be air, pure oxygen, or any other gas containing at least about 1 mol percent free oxygen. In another embodiment, the oxygen-containing gas stream contains oxygen in other forms such as $N_2O$, NO, $SO_2$, $SO_3$, steam, $CO_2$, etc. Preferably, the oxygen-containing gas steam contains at least about 1 mol percent free oxygen and more preferably the oxygen-containing gas steam is air.

As mentioned above, processes according to the present invention include processes for preparing synthesis gas by reacting oxygen from an oxygen-containing gas stream with a hydrocarbyl compound in another gas stream without contaminating the hydrocarbyl compound and/or products of oxidation with other gases from the oxygen-containing gas stream, such as nitrogen from an air stream. Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons. Synthesis gas produced by the partial oxidation of methane, for example, is an exothermic reaction and produces synthesis gas having a useful ratio of hydrogen to carbon monoxide, according to the following equation:

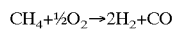
$$CH_4 + \tfrac{1}{2}O_2 \rightarrow 2H_2 + CO$$

Preferred embodiments include processes for preparing synthesis gas by partial oxidation of any vaporizable hydrocarbyl compound. Hydrocarbyl compound used in processes of this invention suitably comprises one or more gaseous or vaporizable compounds that can be reacted with molecular oxygen or carbon dioxide to form synthesis gas. Most suitably, the hydrocarbyl compound is a hydrocarbon such as methane and/or ethane, however, various amounts of oxygen or other atoms can also be in the hydrocarbyl molecule. For example, hydrocarbyl compounds that can be converted to synthesis gas include methanol, dimethyl ether, ethylene oxide, and the like. However, the most preferable hydrocarbyl compounds are the low molecular weight hydrocarbons containing about 1 to about 20 carbons, more preferably 1 to about 10 carbon atoms. Methane, natural gas, which is mainly methane, or other light hydrocarbon mixtures which are readily available and, inexpensive, are particularly preferred hydrocarbyl feed materials for processes of this invention. The natural gas can be either wellhead natural gas or processed natural gas. Composition of processed natural gas varies with the needs of the ultimate user. A typical processed natural gas composition contains about 70 percent by weight of methane, about 10 percent by weight of ethane, 10 percent to 15 percent of $CO_2$, and the balance is made up of smaller amounts of propane, butane and nitrogen. Mixtures of hydrocarbyl and/or hydrocarbon compounds can also be used.

Light hydrocarbon gas streams can be mixed with any inert diluent such as nitrogen, helium, neon, argon, krypton, xenon, or other gas, including steam, which does not interfere with the desired reaction. Nitrogen and steam are diluents of choice.

According to the invention, gaseous lower alkanes (e.g. C1–$C_4$ alkanes) are converted to synthesis gas ("syngas") which comprises a gaseous mixture of molecular hydrogen (H2) and carbon monoxide (CO) and which may contain small amounts (e.g. up to 5 vol. %) of carbon dioxide and substantial amounts (e.g. 40–45 vol. %) of molecular nitrogen (N2) by means of catalytic partial oxidation of the alkanes with air and subsequent steam reforming of unconverted alkanes.

Processes according to the invention are, especially, suitable for conversion of natural gas (typically about 85 to about 95 percent by volume methane, about 2 to about 10 percent by volume ethane, and smaller amounts of propane and butane and traces of higher paraffinic hydrocarbons) into synthesis gas having a desirably low molar ratio of hydrogen to carbon monoxide, e.g. less than 3:1 and preferably about 2:1, i.e. in the range of about 1.8:1 to about 2.2; 1.

Typically, for a process in which synthesis gas is made from methane, ethane, and other light hydrocarbon gases in the presence of a catalyst, the catalyst is within the electrochemical reactor, generally, within the electrochemical reactor cell. However, decisions as to which zones to use for oxygen-containing gas stream and the other gas stream, and the location of catalyst and inert support, if any, will depend on which arrangement is most suitable for the particular application of the present invention. Determination of an optimal arrangement is well within the ability of one of ordinary skill to obtain without undue experimentation.

While the invention is applicable to conversion of lower alkanes, generally, it finds special utility in the conversion of natural gas, which is very rich in methane. Reference below, to the use of methane as a gaseous feedstock is to be understood to be exemplary only.

According to the invention, partial oxidation of methane to carbon monoxide is carried out according to the following reaction:

$$CH_4 + \tfrac{1}{2} O_2 \rightarrow 2\,H_2 + CO \tag{1}$$

Generalized to alkanes, the reaction is set forth as follows:

$$C_nH_m + \tfrac{1}{2}\,O_2 \rightarrow m/2\,H_2O + nCO_2 \tag{2}$$

The partial oxidation reaction is a rapid, highly exothermic reaction which must be controlled to prevent thermal runaway (which in turn leads to deposition of carbon) and to prevent complete oxidation of a substantial proportion (i.e., preferably less than about 20%, and highly preferably less than 5%) of methane to carbon dioxide and water, which occurs according to the following reaction:

$$CH_4 + 2\,O_2 \rightarrow 2\,H_2O + CO_2 \tag{3}$$

Carbon deposition occurs at high temperatures (e.g. above about 1750° F., depending on residence time) according to the following methane decomposition reaction:

$$CH_4 \rightarrow 2H_2 + C \tag{4}$$

Carbon deposition is, preferably, prevented in order to avoid plugging of the catalyst bed, as well as disintegration of catalyst which results from the deposition of carbon inside the catalyst pores which expands as it grows and mechanically destroys the physical integrity of the catalyst.

The process of the invention addresses the problem of how the partial oxidation reaction is controlled, and provides a practical alkane conversion process.

Since partial oxidation of alkanes according to reaction (1) theoretically results in a reaction mixture having a molar H2:CO ratio of about 2:1 and because steam reforming typically generates a product having a higher H2:CO ratio, it is desirable to maximize the yield of product from the partial oxidation step. This must be balanced, however, against the strongly exothermic nature of the partial oxidation reaction and the need to control the temperature thereof.

The feed gas which is subject to partial oxidation must be thoroughly, and preferably continuously, mixed in order to avoid oxygen-rich domains in the partial oxidation catalyst bed which would result in local variations in reaction rate which contribute to thermal runaway and resultant carbon deposition. Since the inventive process is desirably carried out at elevated pressure (i.e. greater than atmospheric pressure, e.g. 50 to 200 psia or more and preferably 50 to 110 psia), and since mixing efficiency decreases as pressure rises, it is essential that flow through the partial oxidation compartment, particularly near the partition, be of sufficient size to ensure as through mixing of the methane-rich feed and the oxygen transported through the partition as possible is provided so as to avoid exotherm formation in the reactor. In general, exotherms in excess of about 225° F. are to be avoided. It has been found that "static" mixing elements or the like disposed in the partial oxidation compartment of the autothermic module or in the feedline thereto are suitable. Useful static mixers include those sold under the tradename "Kenics mixers" and others known in the art.

Adequate control of the partial oxidation reaction is, optionally, facilitated by the use of a partial oxidation catalyst which also has a highly active steam reforming capability. The steam reforming reaction, set forth below, is an endothermic reaction which by its nature produces a hydrogen to carbon monoxide ratio of about 3:1:

$$CH_4 + H_2O \rightarrow 3H_2 + CO \tag{5}$$

Water is provided for the steam reforming reaction in the partial oxidation and steam reforming catalyst beds by the virtually unavoidable complete oxidation of a small portion (preferably less than 10%) of the methane feed, which generally occurs at the inlet to the partial oxidation catalyst bed. (If necessary due to low levels of complete oxidation, supplemental water may be provided preferably in the form of steam, from an external source.) Ideally, water is provided only in an amount sufficient to allow control of the partial oxidation reaction temperature. The steam reforming reaction thus behaves as a natural heat sink to control the temperature of the partial oxidation catalyst bed. This is highly preferable over the use of high surface area mechanical heat transfer elements which require a high capital investment.

The endothermic nature of the reforming reaction complements temperature control effects provided by transfer of heat from the oxidation compartment to the catalytic compartment through the wall therebetween of radiant heat from combustion gases and the partition containing the dense ceramic membrane.

Further, since under typical operation conditions, the partial oxidation reaction is relatively, rapid compared to the steam reforming reactions of the partial oxidation and steam reforming catalysts, it is desirable to use a relatively small partial oxidation catalyst bed and to control flow rates so as to provide a relatively low reactant residence time in order to minimize the amount of methane potentially subject to complete oxidation. Since the residence time is to be minimized, it is desirable that the steam reforming activity of the partial oxidation catalyst be relatively high in order to maintain the catalyst temperature below the methane decomposition temperature. This temperature is believed to be about 1750° F. (depending on residence time), and it is desired to have sufficient steam reforming activity in the oxidation catalyst such that, in combination with the thorough mixing of the air and the methane feed, exotherms in excess of about 225° F. above the reaction temperature, which is preferably in the range of about 1100° F. to about 1750° F., are prevented. The steam reforming activity of the catalyst should be sufficiently high to maintain the temperature of the partial oxidation reaction zone within the desired limits.

It is possible to operate in the partial oxidation catalyst zone at temperatures substantially greater than the preferred maximum of about 1750° F., provided that the residence time is sufficiently low to prevent methane decomposition and resultant carbon (soot) production. For example, temperatures at the entry point (or surface) of the partial oxidation catalyst zone, where complete oxidation (i.e. ignition) of a small amount of feed gas occurs, may reach temperatures of about 2375° F. The temperature quickly drops as the gas flow proceeds through the catalyst bed, however. Methane decomposition can occur even at temperatures lower than 1750° F. if the residence time at such temperatures is sufficiently high. (The rate of methane decomposition is proportional to both temperature and residence time at a given temperature.) It is desirable to maintain the partial oxidation catalyst bed at a relatively high temperature within the desirable operation range of about 1100° F. to about 1750° F., since the efficiency of the entire reaction system improves with higher partial oxidation and steam reforming temperatures.

Under typical operating conditions, it is believed that at least about 20% and preferably at least 60% of the alkanes in the feed will be converted in the autothermic modules, and degrees of conversion in excess of about 80% may be obtainable. The degree of alkane conversion in the autothermic modules is directly related to the catalyst activity and residence time (and therefore the size of the catalyst bed), and will determine the amount of heat generated by the partial oxidation reaction. Ideally, a sufficient degree of alkane conversion will be attained so that the heat generated will be sufficient to sustain the steam reforming reactions which occur in the partial oxidation and steam reforming stages of the system, without the need for heat to be supplied from external sources.

According to the invention the alkanes in the feed are preferably completely converted in the partial oxidation and catalytic and/or steam reforming stages, and with a maximum of about 30 %(and highly preferably no more than about 25%) of the alkanes being completely oxidized to carbon dioxide and water in the partial oxidation stage.

The partial oxidation reaction is carried out in the presence of a small amount of water which is added to the system or produced by the complete oxidation of a portion of the alkane feed in order to maintain the reaction temperature below the desired maximum.

An important function of the partial oxidation catalyst is to control the formation of carbon in order to avoid plugging or mechanical destruction of the catalyst. Although it is desirable to generate synthesis gas at elevated pressure (e.g. about 50 psia or greater) in order to avoid or minimize the need for subsequent compression of syngas-containing products in cases where elevated pressure is desirable to facilitate transmission thereof, high operating pressures require a relatively large gas mixing stage in order to avoid oxygen-rich domains which lead to local increases in temperature which can result in carbon deposition. Since some carbon production may be unavoidable, the oxidation catalyst desirably comprises catalytic means for promoting the following reaction between carbon and water which generates carbon monoxide and hydrogen:

$$C + H_2O \rightarrow H_2 \quad (6)$$

Steam reforming activity is a function of the partial pressure of water (steam) present in the catalyst bed. It is therefore desirable to maintain a steam partial pressure which is sufficiently high to control the reaction temperature generally within desired limits (i.e. without substantially exceeding the desired maximum temperature). However, it is desirable to avoid exceeding the maximum steam partial pressure necessary to control the temperature since the steam reforming reaction generates three moles of hydrogen per mole of carbon monoxide, and it is therefore desirable to preferentially promote the partial oxidation reaction, which generates only two moles of hydrogen per mole of carbon dioxide.

Successful operation without carbon production at pressures of up to at least about 110 psia is desirable in some applications (such as methanol synthesis, for example) to operate at pressures of up to 175 psia, and possibly higher. Maximum operable reaction pressure is a function of temperature (and thus reactor geometry as it affects heat transfer capabilities), the quantity of steam present in the reaction mixture (since maximum operable pressure increases as the partial pressure of steam increases), and the size and efficiency of the gas mixing equipment employed, since mixing efficiency decreases with increasing pressure.

It is necessary to maintain the reaction temperature below the carbon production (alkane decomposition) temperature of about 1750° F. (which depends on residence time) or to add small amounts of steam to the reaction mixture if higher pressures are desired.

The ratio of oxygen permitted to be transported through the membrane to methane in the feed to the autothermic modules may be varied within wide limits, with operation in the range of about 0.2:1 to about 1:1 oxygen-to-methane on a volume basis being practicable. The degree of conversion generally decreases with a decrease in the oxygen to methane ratio, while the controllability of the reaction becomes more difficult with higher ratio levels. Thus, it is preferred to operate within a range of oxygen to methane of about 0.4:1 to about 0.75:1, and a ratio in the range of about 0.5:1 to about 0.65:1 is highly preferred.

The function of the steam reforming catalyst is to convert unconverted methane to synthesis gas by the well-known steam reforming reaction. This reaction is endothermic, and utilizes heat generated in the partial oxidation compartment and, as needed, heat supplied from an external source, such as an electric resistance heater. Suitable catalysts include nickel supported on alumina. Such catalysts generally comprise about 10–50 wt. %Ni.

Since the steam reforming reaction is relatively slow, it may be desirable to use a relatively large steam reforming catalyst bed in order to ensure complete conversion of alkanes. The reaction is readily controllable and stable so that the only constraints on the size of the bed are capital costs. Steam may be supplied from an external source as needed.

As is well known in the art, carbon monoxide is subject to disproportionation at temperatures between about 400° F. and about 1100° F. These minimum and maximum disproportionation temperatures are known in the art as "minimum and maximum Boudart temperatures" respectively. The maximum Boudart temperature is generally below the reaction temperature of the partial oxidation and steam reforming catalyst beds, and the minimum Boudart temperature is generally substantially greater than ambient temperature. As a result, it is highly desirable to rapidly quench product gas leaving the reactor to a temperature well below the minimum Boudart temperature in order to avoid loss of carbon monoxide due to disproportionation. This may, be accomplished by passing hot product gas through a heat exchanger having a high cooling capability for a short residence time.

Temperature control of the partial oxidation reaction is effected by permitting oxygen to be transported through the membrane for oxidation of the alkanes, and by the endothermic nature of the steam reforming reactions, particularly in the catalytic compartment of the autothermic modules. Short residence time in the oxidation compartment enhances temperature control of the highly exothermic partial oxidation reaction. A short residence time also favors partial, rather than complete, oxidation of alkanes The reforming catalyst effects the finishing step in that the steam reforming reaction is endothermic and utilizes heat and water generated in the partial oxidation step. Since this is a stable and highly controllable reaction, substantially complete conversion of alkanes may be obtained.

In all of the herein-above described processes for preparing synthesis gas, it is advantageous to conduct the reaction of the hydrocarbyl compound with the source of oxygen in the presence of a catalyst. For example, catalysts for the steam reforming of methane and other hydrocarbons are commonly based on nickel as the active catalyst component.

Suitable catalysts for processes according to this invention in which synthesis gas is made from methane, ethane, and other light hydrocarbon gases can be used and can include commercial catalysts for steam reforming of methane and other hydrocarbons. Advantageously, catalyst compositions useful for the production of synthesis gas are resistant to coke formation when used to catalyze the reaction of a hydrocarbyl compound with oxygen from an oxygen-containing gas at elevated temperatures to form synthesis gas. For example, Vernon et al. in *Catalysis Letters*, 6, pp. 181–186, (1990), discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. Ashcroft et al. in *Nature*, 352, p. 225, (1991), describes steam reforming of methane with carbon dioxide to form synthesis gas using catalysts such as palladium, ruthenium and iridium on alumina, as well as nickel on alumina. Each of these references is hereby incorporated by reference for its disclosure relating to reforming catalysts.

A preferred class of reforming catalysts is described in commonly assigned U.S. Pat. No. 5,439,861 to Alakananda Bhattacharyya, Mark S. Kleefisch and Carl A. Udovich, which patent is specifically incorporated herein in its entirety by reference.

The catalysts useful in the process of this invention can be prepared from a nickel-containing catalyst precursor compound having a structure that is referred to as "hydrotalcite-like." Hydrotalcite-like compounds are anionic clays, both natural and synthetic, that have a layered or sheet-like structure. For example, hydrotalcite, a naturally occurring mineral, has the chemical composition $[Mg_6Al_2(OH)_{16}]CO_3 \cdot 4H_2O$, and is composed of molecular "sheets", each sheet comprising a mixture of magnesium and aluminum hydroxides. The sheets are separated by carbonate ions which balance the net positive charge of the sheets. In these "sheets," the magnesium and aluminum ions are 6-fold coordinate in hydroxide, and the resulting octahedra share edges to form infinite sheets. Water molecules, like the carbonate ions, are randomly located in the space between these sheets. Although pure hydrotalcite contains only magnesium and aluminum cations, a variety of naturally occurring, as well as synthetic hydrotalcite-like compositions are known. A general formula, for these hydrotalcite-like compounds is:

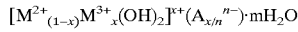

$[M^{2+}_{(1-x)}M^{3+}_x(OH)_2]^{x+}(A_{x/n}{}^{n-}) \cdot mH_2O$ wherein x generally is a number between 0.1 and 0.50, $M^{2+}$ is a 2+metal ion, for example, $Mg^{2+}$ and $M^{3+}$ is a 3+ metal ion, for example, $Al^{3+}$. The anion, $A^{n-}$, can be one of a number of anions such as carbonate. Hydrotalcite-like compounds containing borate as the anion have been disclosed by Bhattacharyya et al., in Inorganic Chemistry, Volume 31, page 3869, 1992. Drezdzon, in Inorganic Chemistry, Volume 27, page 4628, 1988, discloses the synthesis of isopolymetalate-pillared hydrotalcites.

As described above, hydrotalcite-like compounds share the "sheet-like" structural characteristics, which are conveniently identified using x-ray powder diffraction (XRD) analyses. Hydrotalcite-like materials typically have a d(001) value of at least about 7.8Å. Based on the size of the anion used, the hydrotalcite-like molecules can have d(001) values up to 15Å. The d(001) value is indicative of the infra layer spacing present in the hydrotalcite-like materials.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

PREFERRED EMBODIMENTS OF THE INVENTION

FIG. 1 illustrates a preferred embodiment of the present invention using oxygen ion-conducting dense ceramic membranes to separate, selectively, oxygen from an oxygen-containing gas and supply it directly to partial oxidation of gaseous organic compounds, and, simultaneously, conversions of the resulting gaseous mixture to value added products by endothermic chemical reactions. As depicted in sectional view 11 a device in accordance with this invention comprises a shell 20 having an entrance port 12, an exit port 14 and a passageway 21 for movement of a dioxygen-containing gaseous mixture, typically, air, through the passageway, thereby maintaining a positive partial pressure of dioxygen in the passageway during operation.

FIG. 1 illustrates, for clarity, only one autothermic module for chemical conversions positioned within the shell, however, a shell may contain any suitable plurality of modules. Each module comprises a combustion compartment 31 having a feed port 16 and a catalytic compartment 41 having a product port 18. These compartments are in flow communication. Combustion compartment 31 is separated from passageway 21 by gas-tight partition 35 and from catalytic compartment 41 by wall 45. During operation, the catalytic compartment is, substantially, filled by a conversion catalyst (not shown).

Essential elements of the autothermic module include: (i) at least a portion of the gas-tight partition that is a dense ceramic membrane comprising, preferably, a crystalline mixed metal oxide which exhibits, at elevated temperatures, electron conductivity, oxygen ion conductivity and ability to separate oxygen from a gaseous mixture containing dioxygen and one or more other volatile components by means of the conductivities, and (ii) each catalytic compartment has, within the combustion compartment, a substantial portion of wall 45 disposed to receive radiant heat from partition 35 containing the dense ceramic membrane.

In a cross-sectional view perpendicular to the section of FIG. 1, the wall of catalytic compartment can have any closed geometric form, which is, preferably, selected from circular, square or rectangular, and is, more preferably, circular. In such cross-sectional view, the dense ceramic membrane can have any corresponding geometric form, which is, likewise, selected from circular, square or rectangular, and is, more preferably, circular. Preferred autothermic modules of this invention comprise dense ceramic membrane and catalytic compartment wall which form concentric cylinders.

The term "radiant heat" means energy transferred by radiation in the form of electromagnetic waves which travel in straight lines at the speed of light. Molecules or atoms, because of excitation caused by temperature, emit radiant energy in an amount determined by the temperature level of the molecules, and such radiation is capable of passage with more or less absorption to a distant receiver of the radiation.

While we have described a present preferred embodiment of the invention, it is to be distinctly understood that the invention is not limited thereto, but may be otherwise embodied and practiced within the scope of the following claims.

That which is claimed is:

1. A device for conducting, simultaneously, exothermic and endothermic chemical conversions, the device comprising a shell having an entrance port, an exit port and a passageway therebetween for flow of gases comprising a source of oxygen, and within the shell at least one autothermic module for chemical conversions, each module comprising a al combustion compartment having a feed port and a catalytic compartment containing a catalyst and having a product port, the catalytic compartment in flow communication with the partial combustion compartment, a wall of the partial combustion compartment and the passageway being coextensive and defined by a gas-tight partition at least a portion of which comprises a dense ceramic membrane, the dense ceramic membrane further comprising a crystalline mixed metal oxide which exhibits, at operating temperatures, electron conductivity, oxygen ion conductivity and ability to separate oxygen from a gaseous mixture containing oxygen and one or more other volatile components by means of the conductivities, and the catalytic compartment disposed within the partial combustion compartment such that at least a portion of a wall of the catalytic compartment is adjacently disposed to receive radiant heat from at least a portion of the gas-tight partition.

2. The device according to claim 1 wherein the crystalline mixed metal oxide composition is selected from a class of materials which have an X-ray identifiable crystalline structure based upon the structure of the mineral perovskite, $CaTiO_3$.

3. The device according to claim 1 wherein the crystalline mixed metal oxide composition represented by $$D_\alpha E_{\alpha+\beta} O_\delta$$

where D comprises at least one metal selected from the group 3 0 consisting of magnesium, calcium, strontium, and barium, E comprises at least one element selected from the group consisting of vanadium, chromium, manganese, iron, cobalt, and nickel, a is a number in a range from about 1 to about 4, β is a number in a range upward from 0.1 to about 20, such that $$1.1 < (\alpha+\beta)/\alpha \leq 6,$$

and δ is a number which renders the compound charge neutral, wherein the crystalline mixed metal oxide composition has an integral crystalline structure identifiable by means of powder X-ray diffraction pattern analysis.

4. The composition according to claim 3 wherein the integral crystalline structure comprises layers having a perovskite structure held apart by bridging layers having a different structure.

5. The device according to claim 1 wherein the crystalline mixed metal oxide composition represented by $$(D_{1-y}M'_y)_\alpha (E_{1-x}G_x)_{\alpha+\beta} O_\delta$$

where D is a metal selected from the group consisting of magnesium, calcium, strontium, and barium, M' is a metal selected from the group consisting of magnesium, calcium, strontium, barium, copper, zinc, silver, cadmium, gold, and mercury, E is an element selected from the group consisting of vanadium, chromium, manganese, iron, cobalt, and nickel, G is an element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that D, E, G and M' are different independently selected elements, y is a number in a range from about 0.1 to about 0.5, x is a number in a range from about 0.1 to about 0.8, α is a number in a range from about 1 to about 4, β is a number in a range upward from 0.1 to about 20, such that $$1.1 < (\alpha+\beta)/\alpha \leq 6,$$

and δ is a number which renders the compound charge neutral, wherein the crystalline mixed metal oxide composition has an integral crystalline structure identifiable by means of powder X-ray diffraction pattern analysis.

6. The mixed metal oxide composition according to claim 5 wherein x is a number in a range from 0.1 to 0.8, y is a number in a range upward from 0.1 to about 0.5, and β is a number in a range from about 0.1 to about 6, and wherein the integral crystalline structure comprises layers having a perovskite structure held apart by bridging layers having a different structure.

7. The device according to claim 1 wherein the crystalline mixed metal oxide composition represented by $$Sr_\alpha (Fe_{1-x}Co_x)_{\alpha+\beta} O_\delta$$

where x is a number in a range from 0.01 to about 1, α is a number in a range from about 1 to about 4, β is a number in a range upward from 0 to about 20, such that $$1 < (\alpha+\beta)/\alpha \leq 6,$$

and δ is a number which renders the compound charge neutral, and wherein the composition has a powder X-ray diffraction pattern comprising significant lines substantially as described in Table I.

8. The device according to claim 1 wherein the crystalline mixed metal oxide composition represented by $$(Sr_{1-Y}M_Y)_\alpha (Fe_{1-X}Co_X)_{\alpha+\beta} I_\delta$$

where and M is an element selected from the group consisting of yttrium, barium, and lanthanum, X is a number in a range from about 0.01 to about 0.95, Y is a number in a range from about 0.01 to about 0.95, α is a number in a range from about 1 to about 4, β is a number in a range upward from 0 to about 20, such that $$1.1 < (\alpha+\beta)/\alpha \leq 6,$$

and δ is a number which renders the compound charge neutral, and wherein the crystalline mixed metal oxide composition has an integral crystalline structure identifiable by means of powder X-ray diffraction pattern analysis.

9. The device according to claim 8 wherein X is a number in a range from 0.1 to 0.8, Y is a number in a range upward from 0.1 to about 0.5, and β is a number in a range from about 0.1 to about 6, and wherein the integral crystalline structure comprises layers having a perovskite structure held apart by bridging layers having a different structure.

10. The device according to claim 1 wherein the crystalline mixed metal oxide composition represented by Sr Fe Co$_{0.5}$ O$_\delta$ where δ is a number which renders the compound charge neutral, and wherein the composition has a powder X-ray diffraction pattern comprising significant lines substantially as described in Table I.

11. A process for preparation of synthesis gas which comprises:

(A) Providing a device comprising a shell having an entrance port, an exit port and a passageway therebetween for flow of gases comprising a source of oxygen, and within the shell at least one autothermic module for chemical conversions, module comprising a partial combustion compartment having a feed port and a catalytic compartment containing a catalyst and having a product port, the catalytic compartment in flow communication with the partial combustion compartment, a wall of the partial combustion compartment and the passageway being coextensive and defined by a gas-tight partition at least a portion of which comprises a dense ceramic membrane, the dense ceramic membrane further comprising a crystalline mixed metal oxide which exhibits, at operating temperatures, electron conductivity oxygen ion conductivity and ability to separate oxygen from a gaseous mixture containing oxygen and one or more other volatile components by means of the conductivities, and the catalytic compartment disposed within the partial combustion compartment such that at least a portion of a wall of the catalytic compartment is adjacently disposed to receive radiant heat from at least a portion of the gas-tight partition;

(B) Maintaining a relatively high oxygen partial pressure in the passageway by supplying a gaseous mixture comprising a source of oxygen thereto through the entrance port and expelling a depleted gaseous mixture from the passageway through the exit port;

(C) Maintaining a relatively low oxygen partial pressure in the combustion compartment by supplying a dioxygen-free gaseous feed comprising one or more hydrocarbyl compound to the autothermic module through the feed port of the oxidation compartment;

(D) Permitting oxygen to be transported through the membrane from the oxygen-containing gaseous mixture having a relatively high oxygen partial pressure into the gaseous composition having a relatively low oxygen partial pressure, and oxidizing from about 20 to about 40 percent of the hydrocarbyl compounds in the feed to obtain heat and form a resulting mixture comprising oxidation products and unconverted hydrocarbyl compounds;

(E) Contacting the resulting mixture with the chemical conversion catalyst in the catalytic compartment at temperatures in a range from about 500° C. to about 1150° C. to form synthesis gas comprising hydrogen and carbon monoxide; and (F) Permitting heat to be transferred from the partial combustion compartment into the catalytic compartment through a wall of the catalytic compartment, and expelling the synthesis gas from the catalytic compartment through the product port.

12. The process for preparing synthesis gas according to claim 11 wherein the catalyst comprises a composition formed by heat treating under reforming conditions to temperatures in a range upward from at least about 400° C., a catalyst precursor composition comprising at least one hydrotalcite-like compound having formula:

$[M^{2+}{}_w Al^{3+}{}_{(2-y)} M^{3+}{}_y (OH)_{2(w+2)}]^{2+} (A^{n-}{}_{2/n}) \cdot m\ H_2O$, where $M^{2+}$ is at least one metal ion having a valence of 2+ selected from the group consisting of magnesium, chromium, manganese, iron, cobalt, nickel, copper and zinc ions; $M^{3+}$ is at least one metal ion having a valence of 3+ selected from the group consisting of titanium, vanadium chromium, manganese, iron, cobalt, nickel, gallium, ruthenium, rhodium, lanthanum, cerium, praseodymium, neodymium, samarium, europium, gadolinium, terbium, dysprosium, holmium, erbium, thulium, ytterbium, lutetium and iridium ions; w is a number in a range from about 2 to about 20; y is a number in a range from about 0 to about 2; $A^{n-}$ is an anion having a negative charge of n; and m is 0 or a positive number.

13. The process of claim 12 wherein $M^{2+}$ is magnesium ions; $M^{3+}$ is at least one metal ion selected from the group consisting of rhodium and iron ions.

14. The process of claim 12 wherein $M^{3+}$ is rhodium ions, w is about 4; y is a number in a range from about 0.00001 to about 1.5.

15. The process of claim 12 wherein $M^{3+}$ is iron ions, w is about 4; y is a number in a range from about 0.00001 to about 1.5.

16. The process of claim 12 wherein $M^{2+}$ is magnesium ions; $M^{3+}$ is at least rhodium and iron ions, and wherein $A^{n-}$ is carbonate.

17. The process according to claim 11 wherein from about 25 to about 35 percent of the hydrocarbyl compounds in the feed are converted to oxidation products.

18. The process according to claim 11 wherein the hydrocarbyl compounds are selected from the group consisting of methane, ethane, and other hydrocarbon gases.

19. The process according to claim 11 wherein the autothermic module is at temperatures in a temperature range from about 750° C. to about 1050° C.

20. The process according to claim 11 wherein the crystalline mixed metal oxide composition represented by Sr Fe CO$_{0.5}$ O$_\delta$ where δ is a number which renders the compound charge neutral, and wherein the composition has a powder X-ray diffraction pattern comprising significant lines substantially as follows:

| Interplanar Spacing d, Å | Assigned Strength |
|---|---|
| 9.52 ± .05 | Weak |
| 3.17 ± .05 | Weak |
| 2.77 ± .05 | Medium-Strong |
| 2.76 ± .05 | Medium-Strong |
| 2.73 ± .03 | Very Strong |
| 2.08 ± .03 | Weak-Medium |
| 1.96 ± .02 | Medium |
| 1.90 ± .02 | Weak-Medium |
| 1.592 ± .009 | Weak-Medium |
| 1.587 ± .009 | Medium |
| 1.566 ± .009 | Weak. |

* * * * *

UNITED STATES PATENT AND TRADEMARK OFFICE
CERTIFICATE OF CORRECTION

PATENT NO. : 5,980,840
DATED : November 9, 1999
INVENTOR(S) : Mark S. Kleefisch, Carl A. Udovich, Alakananda Bhattacharyya, Thaddeus P. Kobylinski It is certified that error appears in the above-identified patent and that said Letters Patent is hereby corrected as shown below:

| Col. | Line | |
|------|------|---|
| 1 | 30 | "methane, to synthetic fuels" should read: "methane to synthetic fuels" |
| 1 | 54 | "as an intermediate" should read: "as an intermediate." |
| 2 | 50 | "improving the field" should read: "improving the yield" |

Signed and Sealed this

First Day of May, 2001

Attest:

NICHOLAS P. GODICI

Attesting Officer  Acting Director of the United States Patent and Trademark Office

UNITED STATES PATENT AND TRADEMARK OFFICE
CERTIFICATE OF CORRECTION

PATENT NO.: 5,980,840

DATED: November 9, 1999

INVENTOR(S): Mark S. Kleefisch, Carl A. Udovich, Alakananda Bhattacharyya, Thaddeus P. Kobylinski It is certified that error appears in the above-identified patent and that said Letters Patent is hereby corrected as shown below:

Patent reads:

| Col. | Line | | |
|------|------|---|---|
| 3 | 34 | "Anorg. Alig. Chem.," | should read: "Anorg. Allg. Chem.," |
| 3 | 45 | "O$\gamma$" | should read: "O$_\gamma$," |
| 3 | 67 | "CO + H$_2$ $\rightarrow$ " | should read: "CO + H$_2$O $\rightarrow$ " |
| 4 | 66 | "issued to Broecker et al.," | should read: "issued to Schneider et al.," |

UNITED STATES PATENT AND TRADEMARK OFFICE
CERTIFICATE OF CORRECTION

PATENT NO.: 5,980,840

DATED: November 9, 1999

INVENTOR(S): Mark S. Kleefisch, Carl A. Udovich, Alakananda Bhattacharyya, Thaddeus P. Kobylinski It is certified that error appears in the above-identified patent and that said Letters Patent is hereby corrected as shown below:

Patent reads:

| Col. | Line | |
|---|---|---|
| 5 | 18 | "3,865,753 to Broecker"<br><br>should read:<br>"3,865,753, issued to Broecker" |
| 5 | 35 | "$[Ni_{(1-s)}Al_x]$"<br><br>should read:<br>"$[Ni_{(1-x)}Al_x]$" |
| 7 | 63 | "synthesis gas ("syngas")"<br><br>should read:<br>"synthesis gas (syngas)" |
| 8 | 4 | "does not containing substantial"<br><br>should read:<br>"does not contain substantial" |

UNITED STATES PATENT AND TRADEMARK OFFICE
CERTIFICATE OF CORRECTION

PATENT NO.: 5,980,840

DATED: November 9, 1999

INVENTOR(S): Mark S. Kleefisch, Carl A. Udovich, Alakananda Bhattacharyya, Thaddeus P. Kobylinski It is certified that error appears in the above-identified patent and that said Letters Patent is hereby corrected as shown below:

Patent reads:

| Col. | Line | |
|------|------|---|
| 9 | 67 | "$D_\alpha E_{\beta o+\beta} O_\delta$" <br><br> should read: <br> "$D_\alpha E_{\alpha+\beta} O_\delta$" |
| 10 | 17 | "$Sr_{bo}(Fe$" <br><br> should read: <br> "$Sr_\alpha (Fe$" |
| 11 | 43 | "as. perovskites which" <br><br> should read: <br> "as perovskites which" |

UNITED STATES PATENT AND TRADEMARK OFFICE
CERTIFICATE OF CORRECTION

PATENT NO.: 5,980,840

DATED: November 9, 1999

INVENTOR(S): Mark S. Kleefisch, Carl A. Udovich, Alakananda Bhattacharyya, Thaddeus P. Kobylinski It is certified that error appears in the above-identified patent and that said Letters Patent is hereby corrected as shown below:

Patent reads:

| Col. | Line | | |
|---|---|---|---|
| 12 | 14 | "from I to about 8" | should read: "from 1 to about 8" |
| 12 | 41,42 | "by mechanically evacuation" | should read: "by mechanical evacuation" |
| 13 | 18 | "number; 90305684.4," | should read: "number 90305684.4," |
| 13 | 50 | "-stabilized $Z_a$;" | should read: stabilized $ZrO_2$;-- |

UNITED STATES PATENT AND TRADEMARK OFFICE
CERTIFICATE OF CORRECTION

PATENT NO.: 5,980,840

DATED: November 9, 1999

INVENTOR(S): Mark S. Kleefisch, Carl A. Udovich, Alakananda Bhattacharyya, Thaddeus P. Kobylinski It is certified that error appears in the above-identified patent and that said Letters Patent is hereby corrected as shown below:

Patent reads:

| Col. | Line | | |
|------|------|---|---|
| 14 | 33 | "available and, inexpensive," | should read: "available, and inexpensive," |
| 16 | 38 | "relatively, rapid compared" | should read: "relatively rapid compared" |
| 19 | 52 | "synthetic hydrotalcite-like" | should read: "synthetic, hydrotalcite-like" |

UNITED STATES PATENT AND TRADEMARK OFFICE
CERTIFICATE OF CORRECTION

PATENT NO.: 5,980,840

DATED: November 9, 1999

INVENTOR(S): Mark S. Kleefisch, Carl A. Udovich, Alakananda Bhattacharyya, Thaddeus P. Kobylinski It is certified that error appears in the above-identified patent and that said Letters Patent is hereby corrected as shown below:

Patent reads:

| Col. | Line |  |
| --- | --- | --- |
| 20 | 5 | "of the infra layer"<br><br>should read:<br>"of the intra layer" |
| 20 | 46 | "conductivity and ability"<br><br>should read:<br>"conductivity, and ability" |

UNITED STATES PATENT AND TRADEMARK OFFICE
CERTIFICATE OF CORRECTION

PATENT NO. : 5,980,840
DATED : November 9, 1999
INVENTOR(S) : Mark S. Kleefisch, Carl A. Udovich, Alakananda Bhattacharyya, Thaddeus P. Kobylinski It is certified that error appears in the above-identified patent and that said Letters Patent is hereby corrected as shown below:

| Col. | Line | |
|------|------|---|
| 21 | 44 | "group 3 0 consisting of magnesium"<br><br>should read:<br>"group consisting of magnesium" |
| 21 | 47 | "a is a number"<br><br>should read:<br>"$\alpha$ is a number" |
| 23 | 13 | "conversions, module comprising"<br><br>should read:<br>"conversions, each module comprising" |
| 23 | 31 | "gas-tight partition;"<br><br>should read:<br>"gas-tight partition separating the combustion chamber from the passageway;" |